INVENTORS
Bohdan Carniol, Zdeněk Malý

3,345,874
CIRCUIT ARRANGEMENT FOR ACCURATE MEASUREMENT OF TEMPERATURES OR SMALL TEMPERATURE CHANGES

Bohdan Carniol, Prague, and Zdeněk Malý, Kolovraty, Czechoslovakia, assignors to Tesla, národní podnik, Prague, Czechoslovakia
Filed Jan. 13, 1965, Ser. No. 425,300
Claims priority, application Czechoslovakia, Jan. 17, 1964, 293/64
8 Claims. (Cl. 73—362)

This invention relates to the measurement of temperature, and particularly to the measurement of small temperature changes.

Conventional thermometers using an expanding liquid such as mercury are subject to a considerable time lag in their temperature indications, their sensitivity is low, and it is difficult to transmit their readings. Thermometers relying on thermistors or thermoelectric elements do not give readings which meet highest requirements for stability and sensitivity. It is known that changes in the power loss in ferroelectric materials provide a measure of temperature change but this property of ferroelectric materials has not been utilized because of the influence of previous electrical and thermal conditions of the material on the readings produced.

We have now found that temperature may be measured precisely and accurately, when the power loss in ferroelectric materials is determined by its effect on the mean amplitude of the resonant oscillations in a tuned LC-circuit to which a ferroelectric element is coupled. The term "ferroelectric element" will be employed hereinafter to designate a capacity using a ferroelectric material as a dielectric.

The measured mean value is a direct measure of temperature or of temperature change, and readings of extreme sensitivity and stability may be obtained. The measured value is indicated by an electric signal which may be employed for automatic process control.

The circuit arrangement provided by this invention may be employed for measuring indirectly those phenomena which affect the temperature of the ferroelectric element under certain conditions, such as intensity or rate of emitted radiation, flow rate of fluids, and the like.

The measuring arrangement of the invention mainly consists of a tuned LC circuit having a resonant frequency $f_0$ which is connected to a pulse generator generating pulse at a pulse repetition frequency $f_{imp}$ smaller than $f_0$, and thereby initiating exponentially damped oscillations at the resonant frequency in the LC circuit. The latter is further connected to a mean-amplitude detector which may include equipment for indicating the DC component of the rectified voltage or current of the detector. The LC circuit also is connected to the ferroelectric element.

The mean amplitude of the oscillations, as indicated after rectification, is a measure of the damping of the tuned circuit by the connected ferroelectric element, being a function of the power losses in the element. When the temperature of the surroundings of the element changes, the power losses change in such a manner as to keep the temperature of the dielectric nearly constant. The mean amplitude of the oscillations in the LC circuit, therefore, is a measure of the temperature near the ferroelectric element. The sensitivity and stability of the device is greatly increased when the temperature indication is derived from the relationship of the mean amplitude and the peak amplitude of the oscillations in the LC circuit.

The device may be arranged in such a manner that the temperature of the ferroelectric element is only negligibly heated by the signal fed to the LC circuit, or it may be used for heating the ferroelectric element above ambient temperature. The latter arrangement is preferred so that the element operates in a temperature range in which the power loss in the dielectric changes greatly with temperature changes while remaining away from the Curie temperature. It is preferred to control the temperature of the ferroelectric element by means of an independent source of alternating heating current having a frequency $f_z$ which is different from $f_0$ and $f_{imp}$.

Other features and many of the advantages of this invention will be more fully appreciated from consideration of the following description of preferred embodiments when taken in conjunction with the attached drawing in which.

Figure 1:
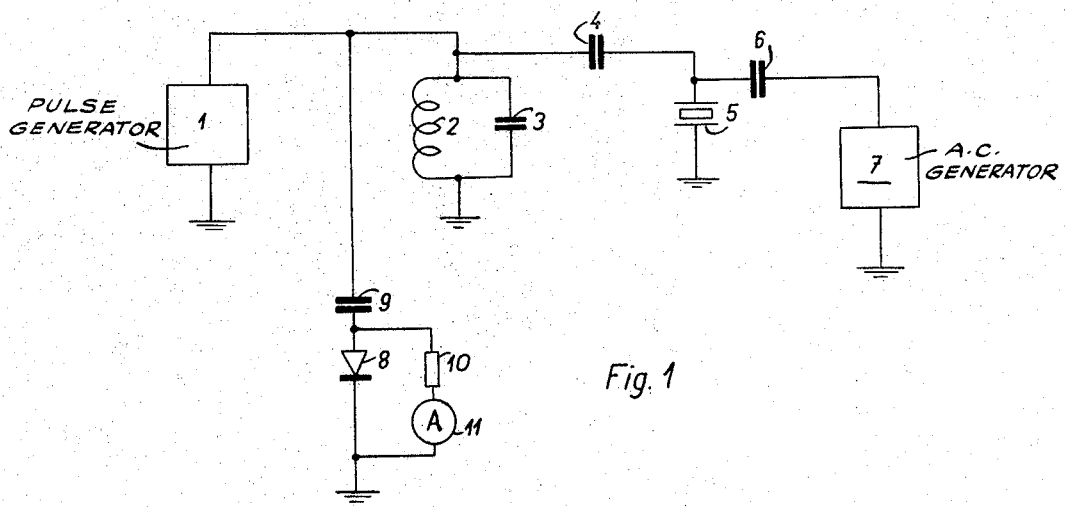
FIG. 1 is a conventional diagram of a first measuring circuit arrangement of the invention.

Referring initially to FIG. 1, there is shown a ferroelectric element 5 of the type disclosed in U.S. Patent 3,065,402 which is connected by a coupling capacitor 4 to a parallel tuned LC-circuit comprising an inductor 2 and a capacitor 3. The ferroelectric element 5 is heated by alternating current of frequency $f_z$ from a generator 7 through a capacitor 6.

A pulse generator 1 having a pulse repetition frequency $f_{imp}$ is connected to the parallel tuned LC-circuit 2, 3 which has a resonant frequency $f_0$, $f_{imp}$ being smaller than $f_0$. Also connected to the parallel tuned LC-circuit 2, 3 is a mean amplitude detector consisting of a coupling capacitor 9 arranged in series with a diode 8 and of a current measuring instrument 11 in series circuit with a resistor 10, the instrument and resistor being connected across the diode 8.

The frequency $f_z$ must be higher or lower than the frequency $f_0$. When the difference between the frequencies is sufficiently great, the LC-circuit 2, 3 represents practically a short circuit for the frequency $f_z$ while the detector is not disturbed by the signal from the heating generator 7. When the amplitude and the frequency $f_0$ of the exponentially damped free oscillations produced in the LC-circuit 2, 3 are suitably selected, the generator 7 and the capacitor 6 may be omitted.

In the operation of the circuit illustrated in FIG. 1, the ferroelectric element 5 is heated by the alternating current of the generator 7. The LC-circuit 2, 3 is simultaneously pulsed by a signal from the pulse generator 1 which initiates exponentially damped free oscillations, the mean value of the oscillations being determined by the detector 8, 9, 10, 11. If the power loss from the ferroelectric element 5 is constant, the damping effect of the element on the LC-circuit 2, 3 remains the same so that the mean amplitude of the exponentially damped free oscillations is also constant as long as all other conditions remain the same.

If the power loss of the ferroelectric element 5 changes, the damping effect of the element 5 on the parallel tuned LC-circuit 2, 3 varies accordingly, and the mean amplitude of the exponentially damped free oscillations also changes. The damping effect of the element 5 being a function of temperature, the measuring element 11 may be calibrated to measure absolute temperature or a temperature difference.

In a specific embodiment, the ferroelectric element 5 is based on barium titanate. It has a capacitance of approximately 1000 pF at 20° C., and is connected to the LC circuit, 2, 3 having a quality factor $Q=150$ and a resonant frequency $f_0=400$ kcs. through the coupling capacitor 4 of 500 to 1000 pF. The pulse generator 1 has a pulse repetition frequency $f_{imp}$ of 10 kcs., and the measuring instrument 11 is a direct-current microammeter having a full-scale deflection of 200 μA. A temperature change of approximately 0.2° C. causes a deviation of the instrument by 200 μA. when the temperature is near the Curie point of the barium titanate (approximately 90° C. maintained by an oil bath). If the power losses in response to the ambient temperature are accurately reproducible, a sensitivity of the order of thousandths of a degree centigrade may be achieved.

Figure 2:
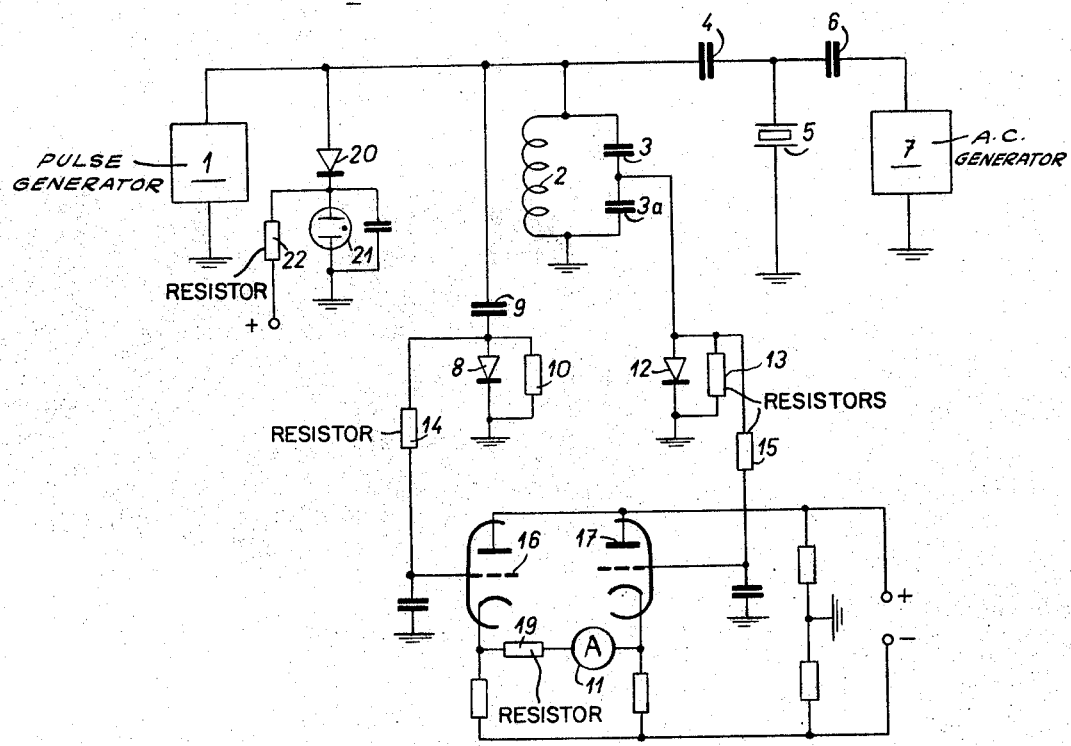
FIG. 2 shows another circuit arrangement of the invention in a view corresponding to FIG. 1.

FIG. 2 shows a circuit whose elements 1 to 11 are substantially identical with those described with reference to FIG. 1. A capacitor 3a in series with the capacitor 3 forms a capacitative divider in the LC circuit for a peak value detector mainly consisting of a diode 12 and a resistor 13. Direct current voltages respectively proportional to the mean and peak values of the oscillations in the LC circuit are applied through resistors 14, 15 to the grids of triodes 16, 17. The measuring instrument 11 which indicates temperature is placed in series with a resistor 19 between the cathodes of the tubes.

It is not necessary that a voltage proportional to the peak value of the oscillations be derived from the capacitative divider 3, 3a, and other dividers, known in themselves, may be employed. The ferroelectric element 5 may be coupled to the tuned LC circuit by any known means which transmit the real impedance component of the ferroelectric element to the tuned circuit.

Figure 3:
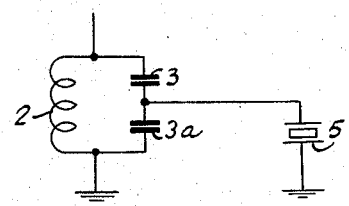
FIGS. 3 to 5 show modified details for the circuits of FIGS. 1 or 2.
Figure 4:
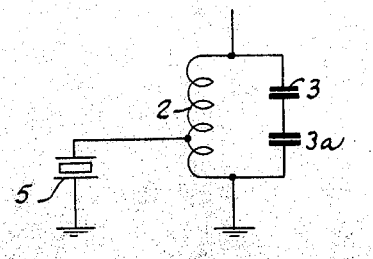
Figure 5:
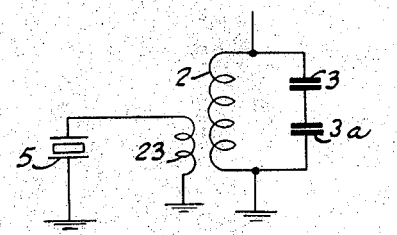

As shown in FIG. 3, the ferroelectric element 5 is coupled to the tuned LC circuit of FIG. 1 (not otherwise shown) by a capacitance divider 3, 3a, the capacitor 3a being arranged in series with the capacitor 3. In the embodiment of FIG. 4, the ferroelectric element 5 is coupled to the LC circuit through a tap on the coil 2. The modification illustrated in FIG. 5 relies on inductive coupling of a winding 23 with the inductor 2, the winding 23 being connected to the ferroelectric element 5. In the circuits of FIGS. 4 and 5, leakage induction of the coil 2 must be held to a minimum if parasitic harmonics are to be avoided.

Reverting to FIG. 2, there is shown an amplitude limiting diode 20 which is biased by the potential of a flow discharge lamp 21. The lamp is energized from a source of direct current through a resistor 22. When the voltage of the glow discharge lamp is lower than the peak voltage of resonant oscillation in the absence of the diode, the arrangement illustrated limits the amplitude of the oscillations, and further stabilizes the circuit.

The power loss of the ferroelectric element 5 at constant ambient temperature is proportional to the rate of heat withdrawal or to the rate of change of any other physical phenomenon which influences the heat balance of the ferroelectric element, such as the flow velocity of a surrounding fluid (liquid or gas), the emission of radiation, and the like. The apparatus of the invention may thus also be used for measuring precisely the rate of ambient phenomena which affect the thermal condition of the ferroelectric element, such as the flow rate of gases or liquids, gas pressure, emission of radiation, and the like.

What we claim is:

1. A measuring arrangement comprising, in combination:

(a) a tuned LC circuit having a resonant frequency $f_o$;

(b) pulse generating means for generating pulses at a pulse repetition frequency $f_{imp}$, $f_{imp}$ being sufficiently smaller than $f_o$ so that a plurality of cycles of oscillations at frequency $f_o$ be included in the interval between any two successive pulses at repetition frequency $f_{imp}$, said pulse generating means being connected to said circuit for initiating oscillations in the same;

(c) a ferroelectric element, said element being a capacitor using a ferroelectric dielectric;

(d) first conductive means connecting said element to said circuit for damping said oscillations in response to the power loss in said element;

(e) a measuring instrument; and (f) second conductive means connecting said measuring instrument to said circuit for indication of a value by the instrument in response to the amplitude of the oscillations in said circuit.

2. An arrangement as set forth in claim 1, further comprising heating means for supplying thermal energy to said element.

3. An arrangement as set forth in claim 2, wherein said heating means include an alternating current generator, the frequency of said alternating current being different from said $f_o$ and said $f_{imp}$.

4. An arrangement as set forth in claim 1, wherein said second conductive means include means for feeding an electrical quantity characteristic of the mean value of said amplitude to said instrument.

5. An arrangement as set forth in claim 1, wherein said second conductive means include a mean value detector and a peak value detector, and circuit means connecting said detectors to said instrument for indication by the instrument of a value characteristic of the relationship of said peak and mean values.

6. An arrangement as set forth in claim 5, wherein said LC circuit includes a capacitative divider, said peak value detector being connected to said circuit by said divider.

7. An arrangement as set forth in claim 1, wherein said first conductive means include a coupling capacitor interposed between said element and said LC circuit.

8. An arrangement as set forth in claim 1, further comprising an amplitude limiting diode connected to said LC circuit, and biasing means for biasing said diode.

References Cited

UNITED STATES PATENTS

| | | | |
|---|---|---|---|
| 2,462,061 | 2/1949 | Beatty | 331—165 X |
| 2,504,719 | 4/1950 | Neilson | 73—339 |
| 2,536,025 | 1/1951 | Blackburn | 73—339 |
| 2,648,823 | 8/1953 | Kock et al. | |

FOREIGN PATENTS

| | | |
|---|---|---|
| 1,351,018 | 12/1963 | France. |
| 955,789 | 1/1957 | Germany. |

LOUIS R. PRINCE, *Primary Examiner.*

DAVID SCHONBERG, *Examiner.*

NEIL SIEGEL, FREDERICK SHOON,
*Assistant Examiners.*